US012494239B2

(12) United States Patent
Kim

(10) Patent No.: US 12,494,239 B2
(45) Date of Patent: Dec. 9, 2025

(54) APPARATUSES AND METHODS FOR PROVIDING COMMAND HAVING ON-THE-FLY (OTF) LATENCY TO MEMORY

(71) Applicant: Samsung Electronics Co., Ltd., Suwon-si (KR)

(72) Inventor: Younghwa Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 186 days.

(21) Appl. No.: 18/455,953

(22) Filed: Aug. 25, 2023

(65) Prior Publication Data

US 2024/0071446 A1    Feb. 29, 2024

(30) Foreign Application Priority Data

Aug. 30, 2022 (KR) .................. 10-2022-0109495
Dec. 22, 2022 (KR) .................. 10-2022-0182181

(51) Int. Cl.
*G11C 7/22* (2006.01)
*G11C 7/10* (2006.01)

(52) U.S. Cl.
CPC ............ *G11C 7/222* (2013.01); *G11C 7/109* (2013.01); *G11C 7/1093* (2013.01)

(58) Field of Classification Search
CPC .................................. G11C 7/222; G11C 7/22
USPC ........................................................ 365/233.1
See application file for complete search history.

(56) References Cited

U.S. PATENT DOCUMENTS

| | | | |
|---|---|---|---|
| 7,043,599 B1 | 5/2006 | Ware et al. | |
| 8,321,627 B1 | 11/2012 | Norrie et al. | |
| 8,358,546 B2 | 1/2013 | Kim et al. | |
| 8,773,928 B2 | 7/2014 | Morgan | |
| 9,997,233 B1* | 6/2018 | Ware .................. | G11C 11/408 |
| 10,068,626 B2 | 9/2018 | Eaton et al. | |
| 10,740,263 B2 | 8/2020 | Mirichigni et al. | |
| 10,860,469 B2 | 12/2020 | Lee et al. | |
| 2010/0070690 A1* | 3/2010 | Amer .................. | G06F 3/0673 |
| | | | 711/E12.001 |
| 2015/0213859 A1* | 7/2015 | Jang .................... | G11C 7/12 |
| | | | 365/194 |
| 2017/0147230 A1* | 5/2017 | Lee ...................... | G06F 12/02 |
| 2018/0122440 A1* | 5/2018 | Manning ............. | G11C 29/023 |

OTHER PUBLICATIONS

Extended European Search Report dated Feb. 16, 2024 for corresponding European Application No. 23194207.9.

* cited by examiner

*Primary Examiner* — Muna A Techane
(74) *Attorney, Agent, or Firm* — Harness, Dickey & Pierce, P.L.C.

(57) ABSTRACT

A memory device supporting OTF latency includes a plurality of signal pins connected to a plurality of signal lines; and a control logic circuit configured to receive an OTF command including a command latency (CDL) value indicating the OTF latency through command lines among the plurality of signal lines, and control an operation of the memory device to be performed based on the OTF latency and a time point at which the OTF command is applied.

20 Claims, 8 Drawing Sheets

| OTF COMMAND | BK ORG | CS | CA0 | CA1 | CA2 | CA3 | CA4 | CA5 | CA6 | CK_t edge |
|---|---|---|---|---|---|---|---|---|---|---|
| REFRESH (REFpb) | Any | Any | L | L | L | H | H | H | L | ⌐ R1 |
| | BG | X | BA0 | BA1 | BG0 | RFM | SB0 | CDL<0> | AB | ⌐ F1 |
| | 16B | | BA0 | BA1 | BA2 | | SB0 | CDL<0> | | |
| | 8B | | BA0 | BA1 | BA2 | | CDL<0> | SB1 | | |

| OTF COMMAND | BK ORG | CS | CA0 | CA1 | CA2 | CA3 | CA4 | CA5 | CA6 | CA7 | CK_t edge |
|---|---|---|---|---|---|---|---|---|---|---|---|
| READ (RD) | Any | H | H | L | L | C0 | C3 | C4 | C5 | CDL<1> | R1 |
| | BG | X | BA0 | BA1 | BG0 | BG1 | C1 | C2 | AP | CDL<0> | F1 |
| | 16B | | BA0 | BA1 | BA2 | BA3 | | | | | |
| | 8B | | BA0 | BA1 | BA2 | B4 | | | | | |

| OTF COMMAND | BK ORG | CS | CA0 | CA1 | CA2 | CA3 | CA4 | CA5 | CA6 | CK_t edge |
|---|---|---|---|---|---|---|---|---|---|---|
| | Any | H | L | L | L | H | H | H | H | ⌐R1 |
| PRECHARGE (PRE) | BG | X | BA0 | BA1 | BA0 | BG1 | CDL<1> | CDL<0> | AB | ⌐F1 |
| | 16B | | BA0 | BA1 | BA2 | BA3 | | | | |
| | 8B | | BA0 | BA1 | BA2 | V | | | | |

| OTF COMMAND | BK ORG | CS | CA0 | CA1 | CA2 | CA3 | CA4 | CA5 | CA6 | CA7 | CK_t edge |
|---|---|---|---|---|---|---|---|---|---|---|---|
| | Any | H | L | H | H | C0 | C3 | C4 | C5 | CDL<1> | ⌐R1 |
| WRITE (WR) | BG | X | BA0 | BA1 | BG0 | BG1 | C1 | C2 | AP | CDL<0> | ⌐F1 |
| | 16B | | BA0 | BA1 | BA2 | BA3 | | | | | |
| | 8B | | BA0 | BA1 | BA2 | V | | | | | |

APPARATUSES AND METHODS FOR PROVIDING COMMAND HAVING ON-THE-FLY (OTF) LATENCY TO MEMORY

CROSS-REFERENCE TO RELATED APPLICATIONS

This application is based on and claims priority under 35 U.S.C. § 119 to Korean Patent Application No. 10-2022-0109495, filed on Aug. 30, 2022, and Korean Patent Application No. 10-2022-0182181, filed on Dec. 22, 2022, in the Korean Intellectual Property Office, the disclosures of which are incorporated by reference herein in their entirety.

BACKGROUND

With the growing demand for electronic systems to speed up, increase data capacity, and consume less power, semiconductor memories that may be accessed faster, store more data, and use less power have been continuously developed. Semiconductor memories generally operate based on commands, addresses and clocks received from a memory controller. A command may control a memory device to perform various memory operations, for example, a read operation for retrieving data from the memory device and a write operation for storing data in the memory device. Data associated with the command may be provided between the memory controller and the memory device at a specified timing relative to reception and/or transmission by the memory device.

External clocks, such as a system clock and a data clock, may be provided to the memory device by the memory controller. The system clock may be used for command and address timing, and the data clock may be used for data write timing provided to the memory device and data read timing provided from the memory device. The memory device may also provide a data clock to the memory controller for timing the transfer of data provided to the memory controller. The frequency of the data clock may be higher than the frequency of the system clock. The frequency of the data clock may be an integer multiple of the system clock frequency, for example four times.

To support high-speed interfaces, the memory controller may cause a user-requested command (e.g., a read/write command) to be executed first to process jobs or tasks of the host, and may later control a refresh operation of a memory device (e.g., dynamic random-access memory (DRAM)). The memory controller may issue a refresh command for another memory bank after issuing a read/write command for a certain memory bank. In this case, as a command timing delay occurs for other banks that may operate independently of each other, bank efficiency is degraded.

Also, the memory controller may control a memory operation so that data transmitted to or received from the memory device is toggled continuously. When data toggling on the data line between the memory controller and the memory device is temporarily suspended, it may be determined that a DQ bubble is generated in the data line. Such DQ bubbles may cause delay and performance degradation of the memory system. If the data toggle is performed continuously without DQ bubbles, it will be beneficial to the high-speed operation performance of the memory system. Accordingly, the memory controller may adjust and provide commands to the memory device so that DQ bubbles do not occur.

For example, the number of system clocks nCK for transmitting or receiving a command via the memory interface may be set to, for example, two clock cycles 2CK. However, the time for transmitting the data burst length (e.g., BL=24) may not be an integer multiple of the clock cycles 2CK. The time taken to transmit burst length (BL=24) data synchronized with the data clock set to 4 times the system clock frequency will be equal to the time of the clock cycles 3CK. In this case, to toggle burst length BL=24 data without DQ bubbles, a command idle state is generated during the clock cycle 1CK. This command idle state degrades command efficiency.

SUMMARY

The inventive concepts relate to semiconductor memories and methods, and more particularly, to providing execution-time variable commands to memory.

The inventive concepts provide a memory device and method for supporting a command that provides a command latency (CDL) indicating a command execution time point on-the-fly (OTF) to improve bank and/or command efficiency of the memory device.

According to some example embodiments of the inventive concepts, there is provided a memory device supporting on-the-fly (OTF) latency, the memory device including a plurality of signal pins connected to a plurality of signal lines, and a control logic circuit configured to, receive an OTF command including a command latency (CDL) value indicating the OTF latency through command lines among the plurality of signal lines, and control an operation according to the OTF command, to be performed after the OTF latency from a time point at which the OTF command is applied.

According to some example embodiments of the inventive concepts, there is provided a memory device supporting OTF latency, the memory device including a plurality of signal pins connected to a plurality of signal lines, and a control logic circuit configured to receive an OTF command including a CDL value indicating the OTF latency through command lines among the plurality of signal lines while data lines of the plurality of signal lines toggle data corresponding to data bursts without data bubbles, and control an operation according to the OTF command to be performed after the OTF latency from a time point at which the OTF command is applied.

According to some example embodiments of the inventive concepts, there is provided an operating method of a memory device supporting OTF latency, the method including receiving an OTF command including a CDL value indicating the OTF latency through command lines among a plurality of signal lines, and performing an operation according to the OTF command after the OTF latency from a time point at which the OTF command is applied.

BRIEF DESCRIPTION OF THE DRAWINGS

Some example embodiments will be more clearly understood from the following detailed description taken in conjunction with the accompanying drawings in which:

FIGS. 9 and 10 are views illustrating on-the-fly (OTF) commands according to some example embodiments of the inventive concepts;

DETAILED DESCRIPTION

Figure 1:
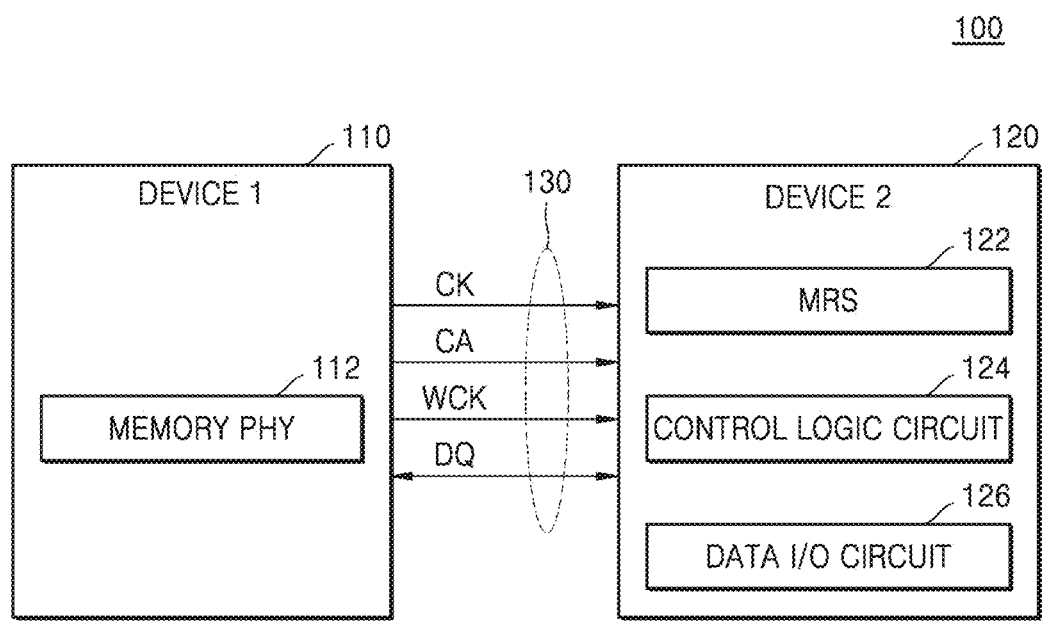
FIG. 1 is a block diagram of an apparatus according to some example embodiments.

FIG. 1 is a block diagram of an apparatus according to some example embodiments.

Referring to FIG. 1, an apparatus 100 includes a first device 110 and/or a second device 120. The apparatus 100 may be implemented to be included in a personal computer (PC) and/or mobile electronic device. Mobile electronic devices may include a laptop computer, a mobile phone, a smart phone, a tablet PC, a personal digital assistants (PDA), an enterprise digital assistant (EDA), a digital still camera, a digital video camera, a Portable Multimedia Player (PMP), a Personal Navigation Device or a Portable Navigation Device (PND), a handheld game console, a Mobile Internet Device (MID), a wearable computer, an Internet of Things (IoT) device, an Internet of Everything (IoE) device, and/or a drone.

The first device 110 may be implemented as an integrated circuit (IC), a system on chip (SoC), an application processor (AP), a mobile AP, a chipset, and/or a set of chips. As an example, the first device 110 may be a semiconductor device that performs a memory control function, and may also be included in the AP. The AP may include a memory controller, random access memory (RAM), a central processing unit (CPU), a graphics processing unit (GPU), and/or a modem.

The second device 120 may be implemented as a volatile memory device. The volatile memory device may be implemented as RAM, dynamic RAM (DRAM), and/or static RAM (SRAM), but is not limited thereto. For example, the second device 2 may correspond to Double Data Rate Synchronous Dynamic Random Access Memory (DDR SDRAM), Low Power Double Data Rate (LPDDR) SDRAM, Graphics Double Data Rate (GDDR) SDRAM, Rambus Dynamic Random Access Memory (RDRAM), and the like. Alternatively, the second device 120 may be implemented as a high bandwidth memory (HBM).

The second device 120 may be implemented as a non-volatile memory device. For example, the second device 120 may be implemented as a resistive memory, such as phase change RAM (PRAM), magnetic RAM (MRAM), and/or resistive RAM (RRAM). Hereinafter, for convenience of explanation, the first device 110 will be referred to as a memory controller and the second device 120 will be referred to as a memory device. Although the memory device 120 is shown as a single semiconductor chip, a plurality of memory devices may be included.

The memory device 120 may be coupled to a bus (or memory bus) 130 through which commands/addresses, data, and/or clocks are transferred. The memory controller 110 and memory device 120 may communicate through several buses. For example, command and address CA signals are received by the memory device 120 on the command/address bus 130, and data DQ is provided between the memory controller 110 and the memory device 120 through the data bus 130. Various clock signals may be provided between the memory controller and the memory device 105 via the clock bus 130. The clock bus 130 may include system clock signals CK_t and CK_c received by the memory device 120, data clock signals WCK_t and WCK_c received by the memory device 120, and/or signal lines for providing the read clock provided by the memory device 120 to the memory controller 110. Each bus 130 may include one or more signal lines through which signals are provided.

The clocks CK_t and CK_c provided to the memory device 120 by the memory controller 110 are used for providing and receiving timing of commands and addresses. The clocks WCK_t and WCK_c are used for timing of data presentation. The clocks CK_t and CK_c are complementary, and the clocks WCK_t and WCK_c are complementary. A clock signal is complementary if a rising edge of the first clock signal coincides with a falling edge of the second clock signal and a rising edge of the second clock signal coincides with a falling edge of the first clock signal.

The clocks WCK_t and WCK_c provided to the memory device 120 by the memory controller 110 may be synchronized with the clocks CK_t and CK_c provided to the memory device 120 by the memory controller 110. Also, the clocks WCK_t and WCK_c may have higher clock frequencies than the clocks CK_t and CK_c. For example, the clocks WCK_t and WCK_c have a clock frequency that is four times the clock frequency of the clocks CK_t and CK_c. Hereinafter, for convenience of description, the clocks CK_t and CK_c may be referred to as clocks CK, and clocks WCK_t and WCK_c may be referred to as clocks WCK.

The memory controller 110 may provide the memory device 120 with a command including command latency CDL information indicating an execution time point of the corresponding command to perform a memory operation. The command latency CDL, which represents the execution time point of a command, is referred to as on-the-fly (OTF) latency, and commands that include OTF latency may be referred to as OTF commands OTF commands may be issued from the memory controller 110 at a random timing. For example, even when the memory device 120 is performing certain operations (e.g., read/write operation), an OTF command issued by the memory controller 110 may be received by the memory device 120 to perform an operation specified by the OTF command Non-limiting examples of the OTF command may include a power down command, an active command, a read command, a write command, a mode register write command, a mode register read command, a Column Address Strobe (CAS) command, a refresh command, a training command, and/or a precharge command of the memory device 120, and the like.

In operation, when a read command and associated address are provided to the memory device 120 by the memory controller 110, the memory device 120 may receive a read command having an OTF latency and a related address, perform a read operation, and output read data DQ from a memory location corresponding to the related address. The OTF latency included in the read command may refer to a read latency RL value indicating the number of clock cycles (referred to as tCK) of the clock CK after the read command when read data DQ is provided to the memory controller 110 by the memory device 120. The OTF read latency may be variable when provided on a read command A read command whose read latency execution time point is variable may be referred to as an OTF read command. The OTF read latency included in the OTF read command may be specified as one of 0, +1, +2, . . . , and +m (m is a natural number) clock cycle numbers.

Figure 11:
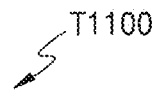
FIGS. 11 and 12 are diagrams illustrating OTF latency representing an execution time point of an OTF command according to some example embodiments of the inventive concepts.
Figure 12:
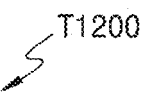

According to some example embodiments, the OTF read latency included in the OTF read command may be variously changed in association with the mode register 122 of the memory device 120. The mode register 122 included in the memory device 120 may be programmed with information for setting various operation modes and/or for selecting features for memory operation. The OTF read latency associated with the mode register 122 may be changed to read latencies with various clock cycle numbers (e.g., +1, +2, +3, +4, +8), as shown in FIG. 11. Alternatively, the OTF read latency associated with the mode register 122 is, as shown in FIG. 12, absolute time (e.g., +x1, +x2, +y1, +y2, +z1, +z2 (x, y, z may be changed to a non-zero integer)).

In operation, when a write command and associated address are provided by the memory controller 110 to the memory device 120, the memory device 120 may receive a write command having an OTF latency and a related address, and perform a write operation to write the write data DQ from the memory controller 110 to a memory location corresponding to the related address. When the write data DQ is provided to the memory device 120 by the memory controller 110, the OTF latency included in the write command may refer to a write latency WL value indicating the number of clock cycles tCK of the clock CK after the write command. The OTF write latency may be variable when provided on a write command A write command whose write latency execution time point is variable may be referred to as an OTF write command. The OTF write latency included in the OTF write command may be specified as one of 0, +1, +2, . . . , and +m (m is a natural number) clock cycle numbers.

According to some example embodiments, the OTF write latency included in the OTF write command may be variously changed in association with the mode register 122 of the memory device 120. The OTF write latency associated with the mode register 122 may be changed to write latencies with various clock cycle numbers (e.g., +1, +2, +3, +4, +8), as shown in FIG. 11. Alternatively, the OTF write latency associated with the mode register 122 is, as shown in FIG. 12, absolute time (e.g., +x1, +x2, +y1, +y2, +z1, +z2 (x, y, z may be changed to a non-zero integer)).

The memory controller 110 may include a memory PHY 112 that provides precise operation timings for performing memory operations on the memory device 120. The memory PHY 112 may include a physical and/or electrical layer and/or a logical layer provided for signals, frequency, timing, driving, detailed operating parameters, and/or functionality required, or sufficient, for efficient communication between the memory controller 110 and the memory device 120. The memory PHY 112 may support features of the double data rate (DDR) and/or low-power DDR (LPDDR) protocol of the Joint Electron Device Engineering Council (JEDEC) standard.

The memory PHY 112 may connect the memory controller 110 and the memory device 120 through the memory bus 130. For brevity of the drawing, through one signal line between the memory controller 110 and the memory device 120, the clock CK, the command/address CA, the clock WCK, and the data DQ are illustrated as being provided, but in reality, they may be provided through a plurality of signal lines and/or a bus. Signal lines between the memory controller 110 and the memory device 120 may be connected through connectors. Connectors may be implemented as pins, balls, signal lines, and/or other hardware components. The memory controller 110 may provide an OTF command including an OPT latency to the memory device 120 through the memory PHY 112.

The memory device 120 may include a mode register 122 (hereinafter referred to as "MRS"), a control logic circuit 124 and/or a data input/output (I/O) circuit 126. The MRS 122 may store information used to configure the operation of the memory device 120 to set operating conditions for the memory device 120. The MRS 122 may store various OTF latency parameter codes representing variable latency execution time points according to CDL information included in the OTF command. The OTF latency parameter code may be expressed as the number nCK of clock CK cycles from the signal CK to which the OTF command is synchronized or as the absolute time (ns) from the signal CK to which the OTF command is synchronized.

The control logic circuit 124 may control the circuits of the memory device 120 to operate as set in the operating and control parameters stored by the MRS 122. The control logic circuit 124 may receive an OTF command from the memory controller 110 and control an operation according to the OTF command to be performed after the OTF latency expressed in the OTF command According to some example embodiments, the control logic circuit 124 may control an operation according to an OTF command to be performed after the OTF latency by using the OTF latency parameter code stored by the MRS 122.

The data I/O circuit 126 may transmit the read data DQ synchronized with the read data clock to the memory controller 110 at the time of the OTF read latency included in the OTF read command. The data I/O circuit 126 may receive the write data DQ synchronized with the clock WCK from the memory controller 110 at the time of the OTF write latency included in the OTF write command Data DQ transmitted and received by the data I/O circuit 126 may include a data width of 8 bits. According to some example embodiments, the data width is 16 bits, and the 16 bits may be divided into a lower byte of 8-bit data and an upper byte of 8-bit data.

Figure 2:
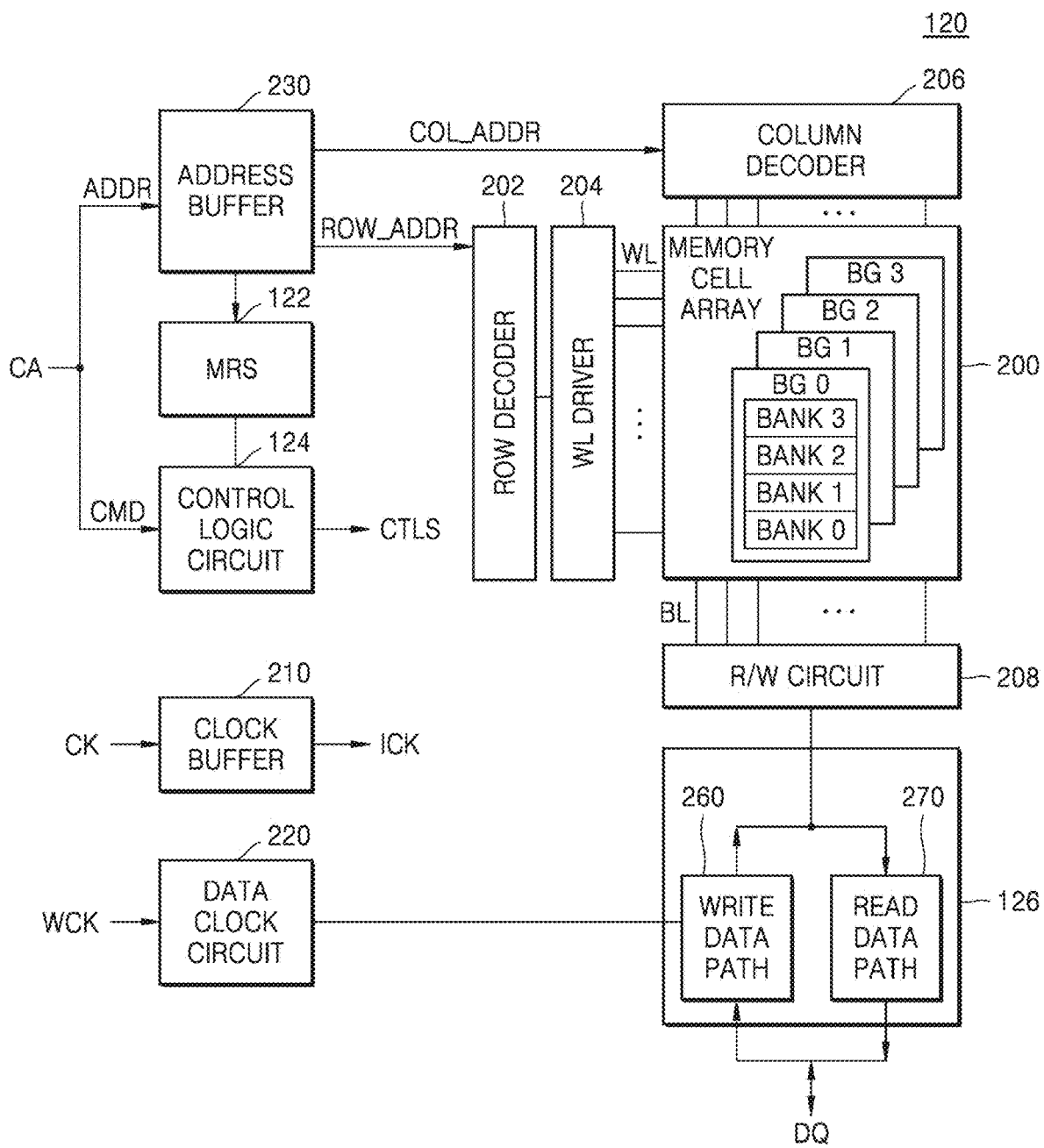
FIG. 2 is a block diagram illustrating a memory device according to some example embodiments.

FIG. 2 is a block diagram illustrating a memory device according to some example embodiments of the inventive concepts.

Referring to FIGS. 1 and 2, the memory device 120 may include a memory cell array 200, a row decoder 202, a word line driver 204, a column decoder 206, a read/write (RW) circuit 208, a clock buffer 210, a data clock circuit 220, an address buffer 230, an MRS 122, a control logic circuit 124, and/or a data I/O circuit 126.

The memory cell array 200 includes a plurality of memory cells provided in a matrix form arranged in rows and columns. The memory cell array 200 includes a plurality of word lines WL and a plurality of bit lines BL connected to the memory cells. The plurality of word lines WL may be connected to rows of memory cells, and the plurality of bit lines BL may be connected to columns of memory cells.

The memory cell array 200 may include a plurality of bank groups BG0 to BG3 including a plurality of banks BANK0 to BANK3. The memory cell array 200 may include 4 bank groups according to a 16 or 8 data DQ signal configuration and may be configured with a bank architecture including 4 banks per bank group, 8 banks or 16 banks.

The row decoder 202 may select one of the plurality of word lines WL connected to the memory cell array 200. The row decoder 202 may decode the row address ROW_ADDR received through the command/address bus 130 and the address buffer 230, select one word line WL corresponding to the row address ROW_ADDR, and be connected to the word line driver 204 that activates the selected word line WL. The column decoder 206 may select preset bit lines BL from among a plurality of bit lines BL of the memory cell array 200. The column decoder 206 may decode the column address COL_ADDR received from the address buffer 230 to generate a column select signal, and connect the bit lines BL selected by the column select signal to the R/W circuit 208.

The R/W circuit 208 may include read data latches for storing read data of the bit lines BL selected by the column select signal, and a write driver for writing write data into the memory cell array 200. The read data stored in the read data latches of the R/W circuit 208 may be provided to the data DQ bus through the data output driver of the read data path 270. Write data may be applied to the memory cell array 200 through the data input buffer of the write data path 260 connected to the data DQ bus 130 and through the write driver of the R/W circuit 208.

The clock buffer 210 may receive the clock CK and generate an internal clock signal ICK. The internal clock signal ICK is provided to the control logic circuit 124 and may be used for timing various operations of the internal circuit. The control logic circuit 124 may receive the OTF command CMD through the command/address bus 130 and generate control signals CTLS that control the operation timing of the memory device 120 and/or the memory operation. The control logic circuit 124 may read data from and write data to the memory cell array 200 using control signals CTLS.

The MRS 122 may store information used by the control logic circuit 124 to configure operations of the memory device 120 to set operating conditions for the memory device 120. The MRS 122 may include registers that store parameter codes for various operation and control parameters used to set operating conditions of the memory device 120. The parameter code may be received by the memory device 120 through the command/address bus 130. The MRS 122 may store OTF latency parameter codes associated with OTF commands.

The control logic circuit 124 may generate control signals CTLS that are provided to the circuits of the memory device 120 to operate as set in the operation and control parameters stored by the MRS 122. The control logic circuit 124 may generate control signals CTLS to perform an operation according to the OTF command after the OTF latency expressed in the received OTF command. The control logic circuit 124 may generate control signals CTLS for performing an operation according to an OTF command based on the OTF latency parameter code stored in the MRS 122. The control signals CTLS may be generated after the OTF latency from the CK signal to which the OTF command is synchronized.

The data I/O circuit 126 may be divided into a write data path 260 including a data input buffer and a read data path 270 including a data output driver. The write data path 260 may include data input buffers that receive write data DQ. The read data path 270 may include data output buffers transmitting read data DQ. The write data path 260 and/or the read data path 270 may be controlled to continuously toggle data without data bubbles in the DQ bus 130 when write data DQ and/or read data DQ are transmitted to the DQ bus 130.

Figures 3, 4:
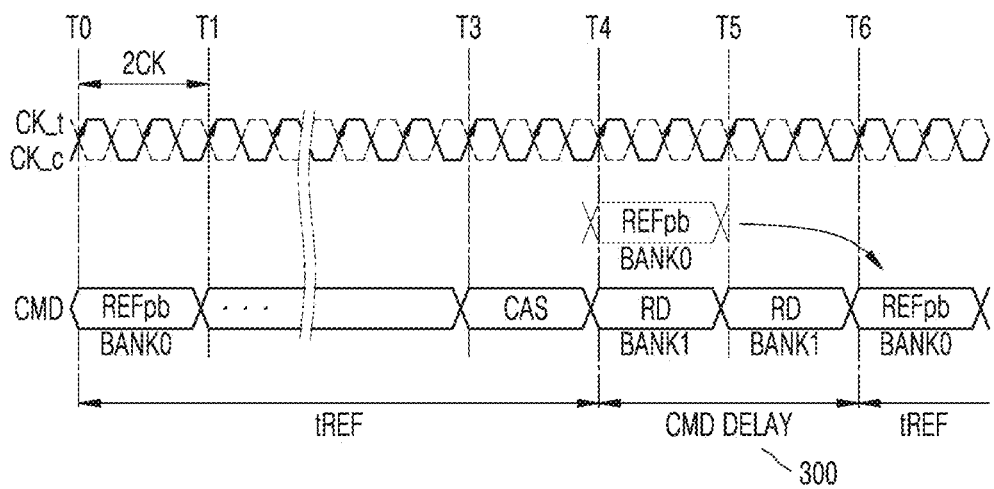
FIG. 3 is a timing diagram illustrating an example of a refresh operation of a memory device.
FIGS. 4 and 5 are diagrams describing a refresh operation of a memory device according to some example embodiments.

FIG. 3 is a timing diagram illustrating an example of a refresh operation of a memory device. For example, the timing diagram of FIG. 3 illustrates an example of a per-bank refresh command.

Figure 5:
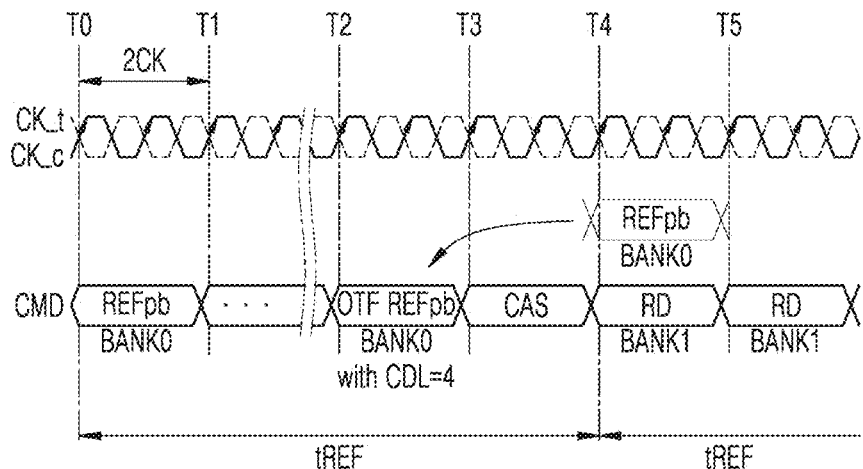

FIGS. 4 and 5 are diagrams describing a refresh operation of a memory device according to some example embodiments. FIG. 4 is a diagram illustrating an OTF per-bank refresh command, and FIG. 5 illustrates a timing diagram associated with the OTF per-bank refresh command of FIG. 4. In the timing diagrams described below, horizontal and vertical axes represent time and voltage levels, respectively, and are not necessarily drawn to scale.

Referring to FIGS. 1, 2, and 3, for a per-bank refresh operation of the memory device 120, a refresh command REFpb for the first bank BANK0 synchronized with the clock CK may be applied at time T0. A bank address and a row address designating the first bank BANK0 on which a refresh operation is to be performed may be received together with the refresh command REFpb. The refresh command REFpb may be applied during the clock cycle 2CK between the time point T0 and the time point T1. Hereinafter, a command for the memory device 120 is described as being synchronized with the clock CK and set to the clock cycle 2CK.

The memory device 120 such as a DRAM may refresh memory cell rows in response to a periodically applied refresh command REFpb. DRAM cells are refreshed by regularly reading all, or one or more, memory cell rows of the DRAM at a given refresh rate tREF. Accordingly, the refresh command REFpb for the first bank BANK0 may be scheduled at time point T4.

At the time point T4, the memory controller 110 may control a read operation to retrieve data for the second bank BANK1 to first process the host's jobs or tasks. Accordingly, a CAS command instructing to prepare for a read operation at time point T3 before the time point T4 is applied, and read commands RD for the second bank BANK1 may be sequentially applied at time points T4 and T5. A bank address, a row address, and a column address designating the second bank BANK1 on which a read operation is to be performed may be received together with the read command RD.

After the read command RD is applied to the second bank BANK1, the refresh command REFpb to the first bank BANK0, which is scheduled at time point T4, may be applied at time point T6. Accordingly, the DRAM cells may be refreshed by reading all, or one or more, memory cell rows of the first bank BANK0 at the refresh rate tREF.

In FIG. 3, a refresh operation is performed on the first bank BANK0 and a read operation is performed on the second bank BANK1. It may be seen that the refresh command for the first bank BANK0 is delayed during the read command RD for the second bank BANK1. The memory device 120 is configured such that operations for different banks are performed independently. That is, the first bank BANK0 may perform the refresh operation while the second bank BANK1 performs the read operation. However, a refresh command (REF) for performing the refresh operation on the first bank BANK0 is delayed for the command delay time 300. For example, the memory device 120 may receive one or more read commands (RD) for BANK1 and a per-bank refresh command (REFpb) for BANK0. The per-bank refresh command (REFpb) for BANK0 may be delayed for a period of the command delay time 300, during which read commands (RD) for BANK1 are received by the memory device 120. As a result, as the memory device 120 experiences bank operation delay, bank operation efficiency may decrease. By minimizing the bank operation delay, the bank operation efficiency of the memory device 120 may be improved.

To reduce bank operation delay, the memory controller 110 may provide an OTF refresh command including command latency CDL information indicating an execution time point of the command to the memory device 120. Referring to FIG. 4, an OTF per-bank refresh command T400 may be used according some embodiments. Operands of the OTF per-bank refresh command REFpb may be based on logic levels of the chip select signal CS and column addresses CA[0] to CA[6].

In relation to the OTF per-bank refresh command REFpb, at the rising edge R1 of the clock CK, operands are provided from the chip select signal CS and column addresses CA[0] to CA[6], and at the falling edge F1 of the clock CK, additional operands may be input according to the bank configuration of the memory cell array 200 (e.g., bank group BG, 16 banks 16B, and 8 banks 8B). Operands (e.g., variables, fields, or values indicating the OTF per-bank refresh command REFpb) may include BG0, BA0 to BA2, RFM, SB0 to SB1, AB and/or CDL<0> according to the DRAM specification (e.g., JEDEC specification on LPDDR, DDR, GDDR devices). Don't care (DC) function is denoted with "X".

BG0 represents a bank group address, BA0 to BA2 represent bank addresses, RFM represents refresh management mode, SB0 to SB1 represent single bank refresh, and AB represents all banks. CDL<0> may indicate OTF latency. The bit value of CDL<0> may initially be set to a default "0" bit value. A default "0" bit value of CDL<0> may mean that OTF latency is not set. To set the OTF latency, the bit value of CDL<0> may be changed from "0" bit value to "1" bit value. The "1" bit value of CDL<0> may be set to, for example, CDL=4, which may set the per-bank refresh command REFpb to be executed after 4CK. Depending on some example embodiments, the OTF latency setting may be determined by various 2nCK (where n is a natural number) calculated by the memory controller 110.

Referring to FIG. 5, the refresh command REFpb for the first bank BANK0 scheduled at time point T4 described in FIG. 3 may be applied with an OTF per-bank refresh command REFpb with CDL=4 at time point T2. After 4CK at time point T2, at time point T4, a refresh operation for the first bank BANK0 may be performed. The first bank BANK0 may refresh DRAM cells by reading all, or one or more, memory cell rows of the first bank BANK0 at the refresh rate tREF. Accordingly, at time point T4, the refresh operation of the first bank BANK0 and the read operation of the second bank BANK1 may be performed independently of each other. The memory device 120 may improve bank efficiency of the memory device 120 as the bank operation delay 300 (see FIG. 3) is reduced, or removed, by the OTF latency of the OTF per-bank refresh command REFpb. Here, the number of clock cycles CK for executing the OTF command are provided as some examples, and one or more embodiments of the present disclosure are not limited thereto.

Figure 6:
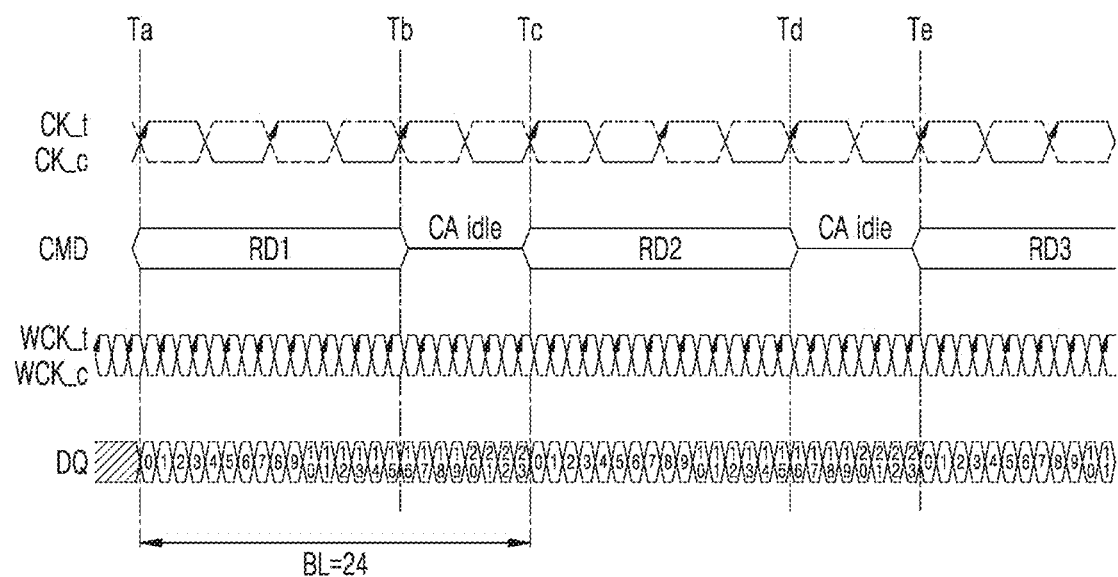
FIG. 6 is a diagram illustrating a comparative example of a read operation of a memory device.

FIG. 6 is a timing diagram illustrating an example of a read operation of a memory device.

Figures 7, 8:
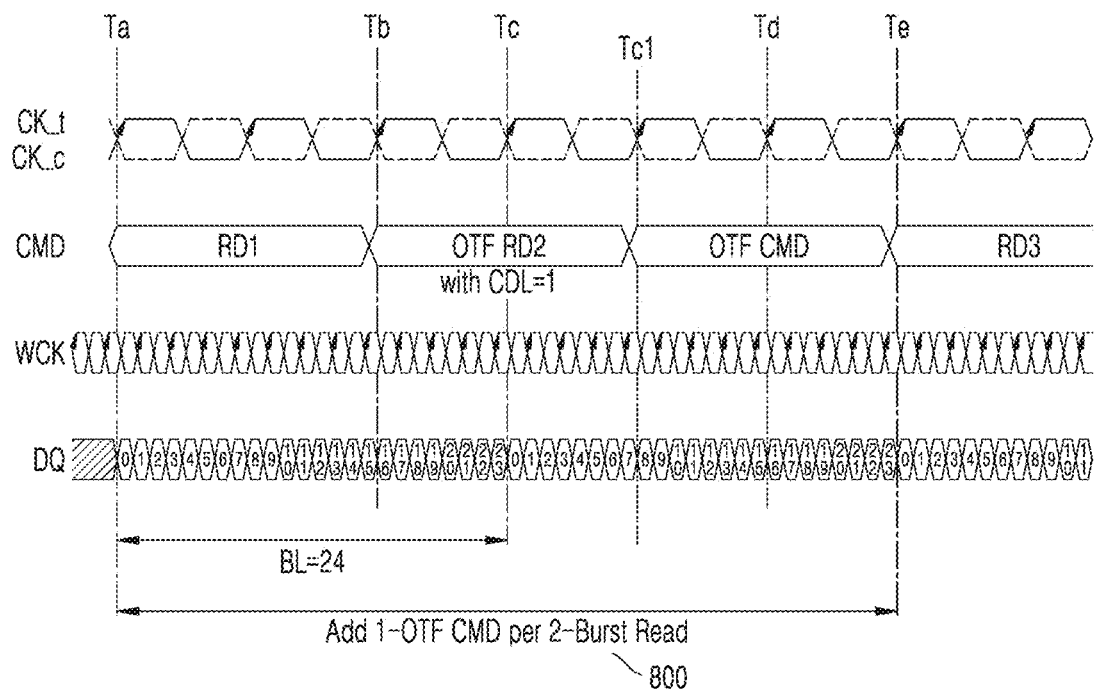
FIGS. 7 and 8 are diagrams describing a read operation of a memory device according to some example embodiments.

FIGS. 7 and 8 are diagrams describing a read operation of a memory device according to some example embodiments. FIG. 7 is a diagram illustrating an OTF read command, and FIG. 8 illustrates a timing diagram associated with the OTF read command of FIG. 7.

Referring to FIGS. 1, 2, and 6, a first read command RD1 synchronized with the clock CK may be applied at time point Ta for a read operation on the memory device 120. A bank address and a row address designating a memory in which a read operation is to be performed may be received together with the first read command RD1. The first read command RD1 may be applied during the clock cycle 2CK between a time point Ta and a time point Tb. Read data DQ having a preset burst length (e.g., BL=24) may be output to the data bus 130 after a read latency RL from the time point Ta. For brevity of the drawing, it will be described that the read data DQ of BL=24 is output from the time point Ta at which the first read command RD1 is applied, and the same will be applied to the following example embodiments.

The read data DQ0 to DQ23 corresponding to the burst length of BL=24 may be output from the time point Ta to the time point Tc in synchronization with the clock WCK in response to the first read command RD1. Since the clock WCK frequency is 4 times the clock CK frequency, the time point from the time point Ta where DQ0 to DQ23 read data is output to the time point Tc corresponds to clock cycles 3CK.

To toggle the read data DQ of BL=24 on the DQ bus 130 without data bubbles, the second read command RD2 may be applied at the time point Tc. A bank address and a row address designating a memory in which a read operation is to be performed may be received together with the second read command RD2. The second read command RD2 may be applied during the clock cycle 2CK between the time point Tc and the time point Td. The read data DQ0 to DQ23 corresponding to the burst length of BL=24 according to the second read command RD2 may be output from the time point Tc to the time point Te in synchronization with the clock WCK. At the time point Te, the third read command RD3 may be applied to toggle the read data DQ without data bubbles.

In FIG. 6, to avoid data bubbles in the DQ bus 130, the memory controller 110 may calculate a memory access operation in which the read data DQ according to the third read command RD3 and the read data DQ according to the second read command RD2 are output successively to the read data DQ according to the first read command RD1. Accordingly, the memory controller 110 may issue the first read command RD1 at the time point Ta, issue the second read command RD2 at the time point Tc, and issue and provide the third read command RD3 to the memory device 120 at the time point Te. At this time, between the time point Tb and the time point Tc, a clock cycle 2CK for issuing the command CMD may not be secured. Similarly, a clock cycle 2CK may not be secured between the time point Td and the time point Te. Accordingly, it may be seen that a CA idle state is generated in the command/address bus 130 carrying the command and address CA during the clock cycle 1CK between the time point Tb and the time point Tc, and during the clock cycle 1CK between the time point Td and the time point Te. For this reason, as the memory device 120 experiences a CA idle state, command efficiency may decrease. If the CA idle state is minimized, command efficiency may be improved to operate the memory device 120.

To reduce CA idle state, the memory controller 110 may provide an OTF read command including command latency CDL information indicating an execution time point of the command to the memory device 120. Referring to FIG. 7, an OTF read command T700 may be used according to some embodiments. Operands of the OTF read command RD may be based on the chip select signal CS and column addresses CA[0] to CA[7].

In relation to the OTF read command RD, at the rising edge R1 of the clock CK, operands are provided from the chip select signal CS and column addresses CA[0] to CA[7], and at the falling edge F1 of the clock CK, additional operands may be input according to the bank configuration of the memory cell array 200 (e.g., bank group BG, 16 banks 16B, and 8 banks 8B). Operands (e.g., variables, fields, or values indicating the OTF read command RD) may include BG0 to BG1, BA0 to BA3, C0 to C5, AP, and CDL[1:0] provided by the DRAM specification.

BG0 to BG1 indicate bank group addresses, BA0 to BA3 indicate bank addresses, C0 to C5 indicate burst sequences, and AP indicates auto-precharge. CDL[1:0] may indicate OTF latency. The CDL[1:0] bit value may initially be set to a default "00" bit value. The default "00" bit value of CDL[1:0] refers to OTF latency not being set. To set the OTF latency, the default "00" bit value may be changed to the "01", "10" or "11" bit value. The "01" bit value of CDL[1:0] may be set to CDL=1, for example. That is, the "01" bit value of CDL[1:0] may be set so that the OTF read command RD is executed after 1CK. A bit value of CDL[1:0] "10" may be set to, for example, CDL=2, and the OTF read command RD is executed after 2CK. A bit value of CDL[1:0] "11" may be set to, for example, CDL=3, and the OTF read command RD is executed after 3CK. Here, the number of clock cycles CK for executing the OTF command are provided as some examples, and one or more embodiments of the present disclosure are not limited thereto.

Referring to FIG. 8, the second read command RD2 at the time point Tc described with reference to FIG. 6 may be applied as the OTF read command RD2 having CDL=1 at the time point Tb. The OTF read command RD2 may include a bit value of "01" of CDL[1:0]. A bank address and a row address designating a memory cell row on which a read operation is to be performed may be received together with the OTF read command RD2. The OTF read command RD2 may be applied during the clock cycle 2CK between the time point Tb and the time point Tc1. The read data DQ0 to DQ23 corresponding to the burst length of BL=24 according to the OTF read command RD2 may be output from the time point Tc to the time point Te in synchronization with the clock WCK. Thereafter, the third read command RD3 may be applied to toggle the read data DQ without data bubbles at the time point Te.

In FIG. 8, during the time from the time point Tc1 after the OTF read command RD2 is applied to the time point Te before the third read command RD3 is applied, the clock cycle 2CK to which a single OTF command may be applied may be secured. Accordingly, the memory controller 110 may additionally issue an OTF command at the time point Tc1. Illustratively, the OTF latency of the added OTF command may be set to CDL=5. After 5CK, which is the sum of the number of clock cycles 2CK of the added OTF command and the number of clock cycles 3CK at which read data DQ corresponding to BL=24 according to the third read command RD3 is output, CDL=5 may be set to execute the added OTF command.

The memory controller 110 may control the memory device 120 to output the read data DQ according to the OTF read command RD2 having CDL=1 of the time point Tb following the read data DQ according to the first read command RD1 of the time point Ta, and the read data DQ according to the third read command RD3 of the time point Te. The memory controller 110 may add one OTF command for every two burst read times 800. Accordingly, command efficiency of the memory device 120 may be improved by reducing, or preventing, a CA idle state from occurring in the command/address bus 130 while reducing, or preventing, data bubbles from occurring in the DQ bus 130.

FIGS. 9 and 10 are views illustrating OTF commands according to some example embodiments of the inventive concepts. FIG. 9 shows an OTF precharge command diagram T900, and FIG. 10 shows an OTF write command diagram T1000.

Referring to FIG. 9, operands of the OTF precharge command PRE are provided from the chip select signal CS and column addresses CA[0] to CA[6]. In relation to the OTF precharge command PRE, at the rising edge R1 of the clock CK, operands are provided from the chip select signal CS and column addresses CA[0] to CA[6], and at the falling edge F1 of the clock CK, additional operands may be input according to the bank configuration of the memory cell array 200 (e.g., bank group BG, 16 banks 16B, and 8 banks 8B). Operands (variables, fields, or values indicating the OTF Precharge Command (PRE)) may include BG0-BG1, BA0-BA3, AB, and CDL[1:0] provided by the DRAM specification.

BG0 to BG1 may indicate bank group addresses, BA0 to BA3 may indicate bank addresses, and AB may indicate all banks. V represents a high (H) or low (L) valid signal. CDL[1:0] may indicate OTF latency. The CDL[1:0] bit value may initially be set to a default "0" bit value. The default "00" bit value of CDL[1:0] refers to that OTF latency is not set. To set the OTF latency, the default "00" bit value may be changed to the "01", "10" or "11" bit value. The "01" bit value of CDL[1:0] may be set to CDL=1, for example. That is, it may be set that the OTF precharge command PRE is executed after 1CK. A bit value of CDL[1:0] "10" may be set to, for example, CDL=2, and the OTF precharge command PRE is executed after 2CK. A bit value of CDL[1:0] "11" may be set to, for example, CDL=3, and the OTF precharge command PRE is executed after 3CK.

Referring to FIG. 10, an OTF write command diagram T1000 is shown. Operands of the OTF write command WR are provided from the chip select signal CS and column addresses CA[0] to CA[7].

In relation to the OTF write command WR, at the rising edge R1 of the clock CK, operands are provided from the chip select signal CS and column addresses CA[0] to CA[7], and at the falling edge F1 of the CK clock, additional operands may be input according to the bank configuration of the memory cell array 200 (e.g., bank group BG, 16 banks 16B, and 8 banks 8B). Operands (variables, fields, or values indicating the OTF write command WR) may include BG0 to BG1, BA0 to BA3, C0 to C5, AP, and CDL[1:0] provided by the DRAM specification.

BG0 to BG1 indicate bank group addresses, BA0 to BA3 indicate bank addresses, C0 to C5 indicate burst sequences, and AP indicate auto-precharge. CDL[1:0] may indicate OTF latency. The CDL[1:0] bit value may initially be set to a default "0" bit value. To set the OTF latency, the default "00" bit value may be changed to the "01", "10" or "11" bit value. The "01" bit value of CDL[1:0] may be set to CDL=1, for example. That is, it may be set that the OTF write command WR is executed after 1CK. A bit value of CDL[1:0] "10" may be set to, for example, CDL=2, and the OTF write command WR is executed after 2CK. A bit value of CDL[1:0] "11" may be set to, for example, CDL=3, and the OTF write command WR is executed after 3CK.

FIGS. 11 and 12 are diagrams illustrating OTF latency representing an execution time point of an OTF command according to some example embodiments of the inventive concepts. Hereinafter, suffixes attached to reference numerals (e.g., a of 122a and b of 122b) are used for distinguishing a plurality of circuits having the same or similar function.

Referring to FIGS. 2 and 11, the OTF latency associated with the OTF command may include first to third mode registers 122a, 122b, and 122c included in the MRS 122. The first to third MRSs 122a, 122b, and 122c may be identified by respective MRS addresses.

The first MRS 122a may store OTF latency as a parameter that allows the OTF command to be executed after +0 (default), +1, +2, or +3 clock CK cycles based on the time point at which the OTF command is applied according to the CDL[1:0] bit value included in the OTF command. The second MRS 122b may store OTF latency as a parameter that allows the OTF command to be executed after +0 (default), +2, +3, or +5 clock CK cycles based on the time point at which the OTF command is applied according to the CDL[1:0] bit value included in the OTF command. The third MRS 122c may store OTF latency as a parameter that allows the OTF command to be executed after +0 (default), +2, +4, or +8 clock CK cycles based on the time point at which the OTF command is applied according to the CDL[1:0] bit value included in the OTF command In some example embodiments, the MRS 122 is illustrated as having three MRS structures representing OTF latency and nCK clock latency, but is not limited thereto and may have various MRS structures. Here, the number of clock cycles CK for executing the OTF command are provided as some examples, and one or more embodiments of the present disclosure are not limited thereto.

Referring to FIGS. 2 and 12, the OTF latency associated with the OTF command may include fourth and fifth MRSs 122d and 122e included in the MRS 122. The fourth and fifth MRSs 122d and 122e may be identified by respective MRS addresses.

The fourth MRS 122d may store OTF latency as a parameter that allows the OTF command to be executed after +0 (default), +x1, +y1, or +z1 time (ns) based on the time point at which the OTF command is applied according to the CDL[1:0] bit value included in the OTF command. The fifth MRS 122e may store OTF latency as a parameter that allows the OTF command to be executed after +0 (default), +x2, +y2, or +z2 time (ns) based on the time point at which the OTF command is applied according to the CDL[1:0] bit value included in the OTF command In some example embodiments, the MRS 122 is illustrated as having two MRS structures expressing OTF latency in absolute time, but is not limited thereto and may have various MRS structures.

Figure 13:
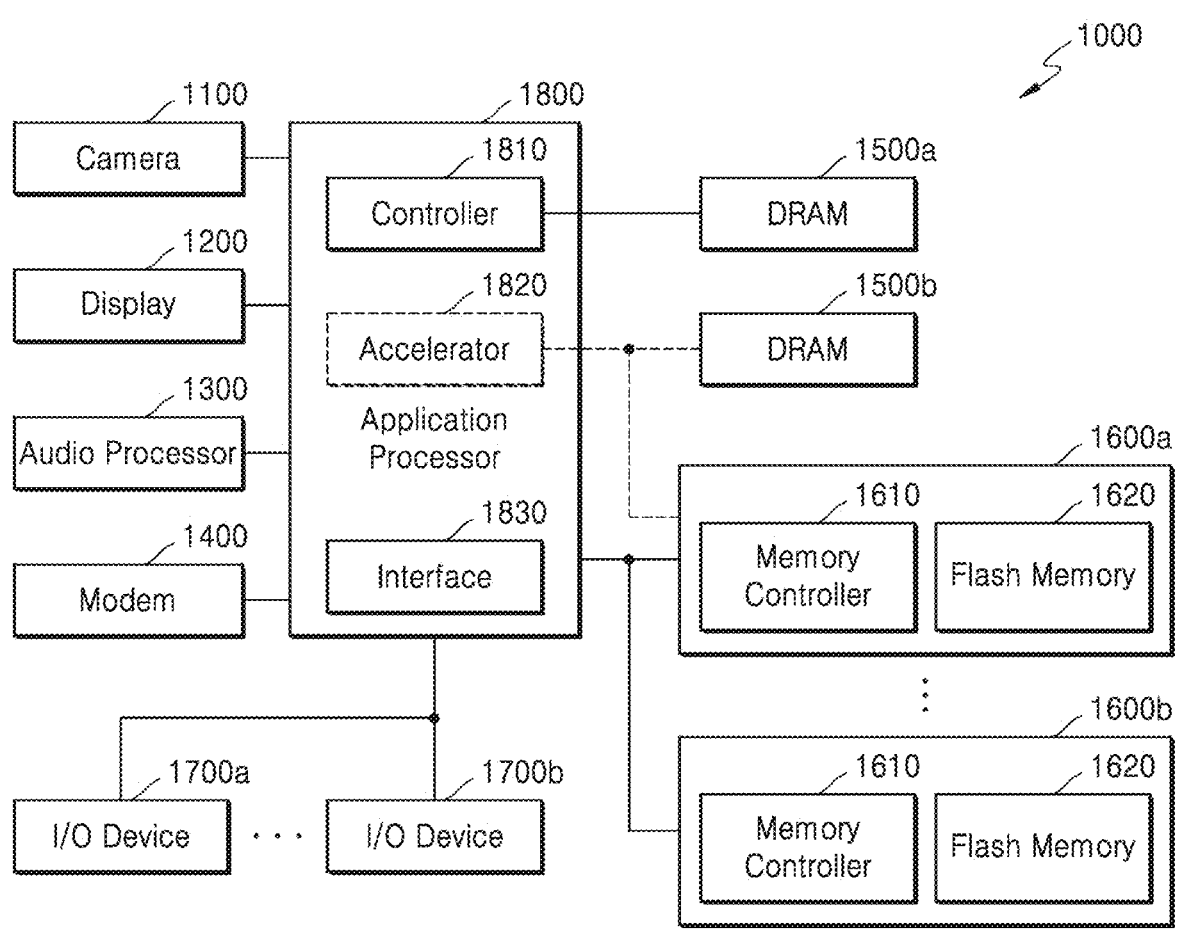
FIG. 13 is a block diagram of a system including a memory device that performs an operation of an OTF command including OTF latency according to some example embodiments of the inventive concepts.

FIG. 13 is a block diagram of a system 1000 including a memory device supporting OTF commands according to some example embodiments of the inventive concepts.

Referring to FIG. 13, the system 1000 may include a camera 1100, a display 1200, an audio processing unit 1300, a modem 1400, DRAMs 1500a and 1500b, flash memories 1600a and 1600b, I/O devices 1700a and 1700b, and/or an application processor (hereinafter referred to as AP) 1800. The system 1000 may be implemented as a laptop computer, a mobile phone, a smart phone, a tablet personal computer, a wearable device, a healthcare device, and/or an Internet of Things (IoT) device. In addition, the system 1000 may be implemented as a server and/or a personal computer.

The camera 1100 may take a still image and/or a moving picture according to a user's control, and may store the captured image/video data and/or transmit the stored captured image/video data to the display 1200. The audio processor 1300 may process audio data included in content of the flash memory devices 1600a and/or 1600b or a network. The modem 1400 modulates and transmits a signal to transmit/receive wired/wireless data, and may demodulate the modulated signal to restore the original signal at the receiving end. The I/O devices 1700a and/or 1700b may include devices that provide digital input and/or output functionality such as a Universal Serial Bus (USB) or storage, a digital camera, a Secure Digital (SD) card, a Digital Versatile Disc (DVD), a network adapter, a touch screen, and the like.

The AP 1800 may control the overall operation of the system 1000. The AP 1800 may include a control block 1810, an accelerator block or accelerator chip 1820, and/or an interface block 1830. The AP 1800 may control the display 1200 so that a part of the content stored in the flash memory devices 1600a and/or 1600b is displayed on the display 1200. When a user input is received through the I/O devices 1700a and/or 1700b, the AP 1800 may perform a control operation corresponding to the user input. The AP 1800 may include an accelerator block, which is a dedicated circuit for artificial intelligence (AI) data operation, or may include an accelerator chip 1820 separately from the AP 1800. A DRAM 1500b may be additionally mounted to the accelerator block or accelerator chip 1820. The accelerator is a function block that professionally performs a certain function of the AP 1800, and may include a GPU that is a function block that specializes in processing graphic data, a Neural Processing Unit (NPU) that is a block for professionally performing AI calculations and inference, and/or a Data Processing Unit (DPU) that is a block for specializing in data transfer.

The system 1000 may include the plurality of DRAMs 1500a and/or 1500b. The AP 1800 may control the DRAMs 1500a and/or 1500b through the command and MRS setting that meets the Joint Electron Device Engineering Council (JEDEC) standard, and communicate by setting the DRAM interface protocol to use company-certain functions such as low voltage/high speed/reliability and Cyclic Redundancy Check (CRC)/Error Correction Code (ECC) functions. For example, the AP 1800 may communicate with the DRAM 1500a through an interface conforming to JEDEC DDR, LPDDR and GDDR standards. The accelerator block or accelerator chip 1820 may communicate by setting a new DRAM interface protocol to control the accelerator DRAM 1500b having a higher bandwidth than the DRAM 1500a.

Although only the DRAMs 1500a and 1500b are illustrated in FIG. 13, the inventive concepts are not limited thereto, and if the AP 1800 and/or accelerator chip 1820 bandwidth, reaction speed, and/or voltage conditions are satisfied, any memory, such as PRAM, SRAM, MRAM, RRAM, FRAM, and/or Hybrid RAM, may be used. The DRAMs 1500a and/or 1500b have relatively smaller latency and bandwidth than the I/O devices 1700a and 1700b or the flash memories 1600a and 1600b. The DRAMs 1500a and 1500b may be initialized at the power-on time point of system 1000, and may be used as a temporary storage location for the operating system and application data loaded with the operating system and application data, or may be used as an execution space for various software codes.

In the DRAMs 1500a and/or 1500b, addition/subtraction/multiplication/division operations, vector operations, address operations, and/or Fast Fourier Transform (FFT) operations may be performed. In addition, a function used for inference may be performed in the DRAMs 1500a and/or 1500b. Here, the inference may be performed in a deep learning algorithm using an artificial neural network. The deep learning algorithm may include a training operation of learning a model through various data and an inference operation of recognizing data with the learned model. In some example embodiments, the image captured by the user through the camera 1100 is signal-processed and stored in the DRAM 1500b, and the accelerator block or accelerator chip 1820 may perform AI data operation for recognizing data using data stored in the DRAM 1500b and a function used for inference.

The system 1000 may include a plurality of storage and/or a plurality of flash memories 1600a and/or 1600b having a larger capacity than the DRAMs 1500a and/or 1500b. The accelerator block or accelerator chip 1820 may perform a training operation and AI data operation by using the flash memories 1600a and/or 1600b. In some example embodiments, the flash memories 1600a and/or 1600b include a memory controller 1610 and a flash memory device 1620, and may more efficiently perform a training operation performed by the AP 1800 and/or the accelerator chip 1820 and inference AI data calculation by using an arithmetic unit included in the memory controller 1610. The flash memories 1600a and/or 1600b may store pictures taken through the camera 1100 and/or data transmitted through a data network. For example, augmented reality/virtual reality, High Definition (HD), and/or Ultra High Definition (UHD) content may be stored.

In the system 1000, the DRAMs 1500a and/or 1500b may receive the execution time point variable OTF command described with reference to FIGS. 1 to 12 and perform an operation according to the OTF command after the OTF latency expressed in the OTF command. The OTF command includes a command latency CDL value indicating OTF latency, and an OTF latency parameter code related to the CDL value may be stored in the MRS. The OTF latency may be expressed as an absolute time from the clock signal to which the OTF command is synchronized or the number of n (n is an integer including zero) clock cycles of the clock signal to which the OTF command is synchronized.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to some example embodiments thereof, it will be understood that various changes in form and details may be made therein without departing from the spirit and scope of the following claims.

What is claimed is:

1. A memory device configured to receive an on-the-fly (OTF) latency, the memory device comprising:
   a plurality of signal pins connected to a plurality of signal lines; and
   a control logic circuit configured to, during performance of a first operation:
      receive an OTF command including a command latency (CDL) value indicating the OTF latency, from an external device, through command lines among the plurality of signal lines, and
      control a second operation, different from the first operation, of the memory device to be performed based on the OTF latency and a time point at which the OTF command is applied.

2. The memory device of claim 1, wherein the OTF latency indicates an n number of clock cycles of a clock signal to which the OTF command is synchronized, wherein n is an integer, and
   wherein the control logic circuit is configured to perform the second operation after the n number of clock cycles of the clock signal from the time point at which the OTF command is applied.

3. The memory device of claim 1, wherein the OTF latency corresponds with an absolute time from a clock signal to which the OTF command is synchronized.

4. The memory device of claim 1, wherein the OTF command includes a default OTF latency for the CDL value.

5. The memory device of claim 1, further comprising a mode register configured to store an OTF latency parameter code associated with the CDL value.

6. The memory device of claim 1, further comprising a memory cell array including a plurality of memory banks,
   wherein the control logic circuit is configured to receive operands of the OTF command through the command lines according to one or more bank addresses or one or more bank groups associated with the plurality of memory banks.

7. The memory device of claim 6, wherein the OTF command includes instructions for accessing a second memory bank among the plurality of memory banks while accessing a first memory bank among the plurality of memory banks.

8. The memory device of claim 1, wherein the OTF command includes a power down command, an active command, a read command, a write command, a mode register write command, a mode register read command, a Column Address Strobe (CAS) command, a refresh command, a training command, or a precharge command, of the memory device.

9. A memory device comprising:
   a plurality of signal pins connected to a plurality of signal lines; and
   a control logic circuit configured to:
      receive an OTF command including a command latency (CDL) value indicating an OTF latency, from an external device, through command lines among the plurality of signal lines when data lines of the plurality of signal lines toggle data corresponding to data bursts of the memory device during performance of a first operation, and
      control a second operation, different from the first operation, of the memory device to be performed based on the OTF latency of the OTF command and a time point at which the OTF command is applied.

10. The memory device of claim 9, wherein the OTF latency indicates an n number of clock cycles of a clock signal to which the OTF command is synchronized, wherein n is an integer, and
    wherein the control logic circuit is configured to perform the operation of the memory device after the n number of clock cycles of the clock signal from the time point at which the OTF command is applied.

11. The memory device of claim 9, wherein the OTF latency corresponds with an absolute time from a clock signal to which the OTF command is synchronized.

12. The memory device of claim 9, wherein the OTF command includes a default OTF latency for the CDL value.

13. The memory device of claim 9, further comprising a mode register configured to store an OTF latency parameter code associated with the CDL value.

14. The memory device of claim 9, wherein the memory device further comprises a memory cell array including a plurality of memory banks, and
    wherein the control logic circuit is configured to receive operands of the OTF command through the command lines according to one or more bank addresses or one or more bank groups associated with the plurality of memory banks.

15. The memory device of claim 14, wherein the OTF command includes instructions for accessing a second memory bank among the plurality of memory banks while accessing a first memory bank among the plurality of memory banks.

16. The memory device of claim 9, wherein the OTF command is any one of a power down command, an active command, a read command, a write command, a mode register write command, a mode register read command, a Column Address Strobe (CAS) command, a refresh command, a training command, or a precharge command, of the memory device.

17. An operating method of a memory device configured to receive an on-the-fly (OTF) latency, the method comprising:

receiving an OTF command including a command latency (CDL) value indicating the OTF latency through a command address bus among a plurality of buses during performance of a first operation; and performing a second operation, different from the first operation, of the memory device based on the OTF latency and a time point at which the OTF command is applied, wherein the command address bus is configured to receive a plurality of command and address signals including the OTF command and an address related to the OTF command.

18. The method of claim 17, further comprising toggling data corresponding to a data burst without data bubbles through a data bus of the plurality of buses, wherein the OTF command is received during a time the data burst is output.

19. The method of claim 17, further comprising storing an OTF latency parameter code related to the CDL value in a mode register.

20. The method of claim 19, wherein the OTF latency parameter code includes one of n number of clock cycles and an absolute time from a clock signal to which the OTF command is synchronized, wherein n is an integer.

* * * * *